United States Patent
Ahlgren

(10) Patent No.: US 6,244,441 B1
(45) Date of Patent: Jun. 12, 2001

(54) HEAT SEALABLE BARRIER FILM FOR FLUID FILLABLE PACKAGING CUSHIONS AND CUSHIONS MADE THEREFROM

(75) Inventor: Kelly Ray Ahlgren, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/438,562

(22) Filed: Nov. 10, 1999

(51) Int. Cl.$^7$ .................................................. B65D 81/02
(52) U.S. Cl. .......................... 206/522; 206/484; 206/590; 156/273.7; 383/3; 428/35.2
(58) Field of Search ..................... 206/522, 484, 206/484.2, 590–594; 156/272.2, 273.7; 383/3; 428/35.2, 35.4, 36.6, 36.7, 108, 332–336

(56) References Cited

U.S. PATENT DOCUMENTS

| | | |
|---|---|---|
| 3,889,743 * | 6/1975 | Presnick ................................ 206/522 |
| 3,938,298 | 2/1976 | Luhman et al. . |
| 4,469,742 | 9/1984 | Oberle et al. . |
| 4,551,379 | 11/1985 | Kerr . |
| 4,739,884 | 4/1988 | Duplessy . |
| 4,905,835 | 3/1990 | Pivert et al. . |
| 4,969,312 | 11/1990 | Pivert et al. . |
| 5,134,930 | 8/1992 | Mei-Hwa . |
| 5,184,727 | 2/1993 | Dickie et al. . |
| 5,348,157 | 9/1994 | Pozzo . |
| 5,351,829 | 10/1994 | Batsford . |
| 5,454,642 | 10/1995 | DeLuca . |
| 5,588,533 | 12/1996 | Farison et al. . |
| 5,620,096 | 4/1997 | Pozzo . |
| 5,692,833 | 12/1997 | DeLuca . |
| 5,693,163 | 12/1997 | Hoover et al. . |
| 5,727,270 | 3/1998 | Cope et al. . |
| 5,762,197 | 6/1998 | Farison . |
| 5,769,232 * | 6/1998 | Cash et al. ........................... 206/522 |
| 5,791,477 | 8/1998 | Batsford . |
| 5,803,263 | 9/1998 | Pozzo . |
| 5,830,780 | 11/1998 | Dennison et al. . |
| 5,846,620 | 12/1998 | Compton . |
| 5,852,914 | 12/1998 | Mueller . |
| 5,857,571 | 1/1999 | Tschantz et al. . |
| 6,083,584 * | 7/2000 | Smith et al. ....................... 428/35.2 |
| 6,083,587 * | 7/2000 | Smith et al. ....................... 428/36.6 |

* cited by examiner

Primary Examiner—Luan K. Bui
(74) Attorney, Agent, or Firm—Lerner, David, Littenberg, Krumholz & Mentlik, LLP

(57) ABSTRACT

Gas impermeable thermoplastic films of multilayer construction are disclosed which are particularly suitable for use in the manufacture of inflatable packaging cushions for protection of packaged objects. The multilayer films have outer heat sealable layers which are radio frequency inactive. The inflatable packaging cushion is fabricated by heat sealing the outer layers of the multilayer film together to form gas inflatable pockets using conventional heat sealing techniques. The heat sealed regions have increased mechanical strength without the need for post irradiation treatment. The thermoplastic film includes at least two outer layers of heat sealable material including linear low-density polyethylene polymers separated by a gas impermeable layer, e.g., an oxygen barrier. Additional adhesive layers and/or structural intervening layers may be coextruded in forming the resulting thermoplastic films.

46 Claims, 3 Drawing Sheets

HEAT SEALABLE BARRIER FILM FOR FLUID FILLABLE PACKAGING CUSHIONS AND CUSHIONS MADE THEREFROM

FIELD OF THE INVENTION

The present invention is generally directed to gas impermeable thermoplastic films for use in packaging articles of various sizes and configurations. More particularly, the present invention is directed to the use of such films to form inflatable packaging cushions which protect an article during shipping or during other handling conditions.

BACKGROUND OF THE INVENTION

Protective packaging materials are commonly used to cushion a wide variety of products during shipping. These packaging materials exist in a wide variety of forms, including waste paper, embossed paper, foam beads or "peanuts" and expanded foams. Some of these materials are time-consuming to use, while others require a large amount of storage space, as well as disposal problems. Moreover, these forms of packaging materials do not always provide the cushioning needed when shipping and/or during other product handling conditions.

In seeking better protective packaging materials, various forms of air inflated cushions have been suggested. These cushions may be used to completely surround the article, to surround the end of an article and protect it from the outer container, and to separate articles from one another within an outer container.

Typically, inflatable packaging cushions are made from thermoplastic sheets which have been hermetically sealed around their periphery for retaining a fluid, such as air under pressure. An important criteria in using these cushions is that they not be punctured or otherwise deflated before the packaged article has safely reached its destination. In that regard, the films used to form these inflatable cushions take on a critical role. The films must exhibit high strength, high puncture resistance, and low gas or air permeability, and be capable of forming and maintaining a hermetic sheet-to-sheet seal. Examples of such inflatable cushions are disclosed in Farison, et al., U.S. Pat. No. 5,588,533; Pozzo, U.S. Pat. No. 5,620,096; and Pozzo, U.S. Pat. No. 5,803,263, all owned by the same assignee of the present application, the disclosures of which are incorporated herein by reference.

Presently, inflatable packaging cushions are often formed from multilayer films which are sealed together to form air pockets using radio frequency (Rf) energy. These films typically have an outer Rf active seal layer that includes an effective amount of an Rf active polymer such as high vinyl acetate ethylene/vinyl acetate (HVA-EVA) copolymer. By high vinyl acetate (HVA), it is meant that the ethylene/vinyl acetate (EVA) copolymer has a sufficiently high level of the polar vinyl acetate monomer to provide the copolymer with the ability to absorb an amount of Rf energy effective to make a seal. Effective amounts of vinyl acetate monomer in the copolymer include from about 12% to 28%, more particularly 18% to 28%, by weight of the copolymer. The HVA-EVA layer in the film thus acts as a receptor for the radio-frequency (Rf) energy needed to make the Rf seal that holds the two sheets of the film together.

Generally, an Rf active polymer is a polymer that efficiently absorbs Rf energy as a result of the polymer's chemical nature. An Rf active seal layer contains an amount of Rf active polymer effective to make an Rf seal when exposed to Rf energy. The Rf activity of a seal layer may be characterized by its dielectric loss factor, which is the composite of the dielectric loss factors of the constituents of the seal layer. The dielectric loss factor of a polymer is associated with the dipole moment about a carbon center. A polymer having a larger dipole moment is generally more likely to be active in an Rf energy field, i.e., more susceptible to excitation by Rf energy, and thus will generally have a higher dielectric loss factor.

Ethylene/butyl acrylate copolymer (EBA) and ethylene/vinyl acetate (EVA) may both be considered Rf active polymers if a sufficient amount of the butyl acrylate or vinyl acetate moieties are present. However, because EBA has a higher dipole moment than EVA, EBA can achieve a dielectric loss factor of about 0.2 with only 6 mole % butyl acrylate, whereas EVA requires 12 mole % vinyl acetate to achieve the same dielectric loss factor.

Rf activity of a polymer is also associated with the mass balance about a central carbon. A lower mass difference generally indicates less Rf activity. For example, ethylene/acrylic acid copolymer has a lower dielectric loss factor than EBA. This is in part because of the relatively low difference in atomic weight between the COOH [45] and the opposing hydrogen [1] of the ethylene/acrylic acid copolymer compared to the much greater difference between the COO(CH$_2$)$_3$CH$_3$ group [101] opposing the hydrogen [1] of EBA.

The Rf activity of a polymer may also depend on the differential density about a central carbon, with a greater differential density indicating greater tendency for Rf activity. For example, polyvinyl chloride (PVC) has a chlorine atom [35.4] opposite the hydrogen atom [1] and therefore has a relatively high differential density. Therefore, although PVC has a lower mass imbalance about the main chain carbon than does EBA, PVC nevertheless is Rf active in part because of the large differential density.

Rf sealed inflatable cushion films also generally include a polyamide layer which provides significant wall strength to the package and serves as an air barrier enabling the cushions to retain air under pressure. Without sufficient barrier, the air will permeate from the high pressure package over time. One known inflatable packaging cushion from HVA-EVA copolymer which employs Rf sealing is constructed from a ten-ply, collapsed bubble. The package is produced from 10 mils of a blown film having the structural layers of HVA-EVA/EVA adhesive/polyamide/EVA adhesive/EVA/EVA/EVA adhesive/polyamide/EVA adhesive/EVA. The film is about 80% by weight HVA-EVA polymer.

There are many drawbacks to the use of Rf energy to seal together packaging cushion films. Firstly, the Rf active seal layer requires the presence of an effective amount of Rf active polymer (e.g., HVA-EVA). This requirement limits flexibility in designing an inflatable cushion packaging film and may cause an overall film thickness greater than that needed merely for strength and barrier properties. For example, inflatable packaging cushions films that incorporate an Rf seal layer of HVA-EVA must be at least about 10 mils thick to seal properly using Rf energy.

Further, Rf active polymers are generally lower in melting point and lower in tensile strength. The relatively low melting point of the Rf active polymers limits the temperature range for end uses because at elevated temperatures many Rf active seal layers become soft enough to rupture the Rf seals. Additionally, since one of the primary uses for inflated cushion packages is to protect expensive objects during shipment, the low tensile strength of the Rf active seal layers and polymers may often be inadequate for protection of heavy objects due to seal rupture during drop testing.

As a consequence, many Rf sealed films must be subjected to an ionizing radiation step, i.e., electron beam or gamma radiation, to crosslink the polymers to improve seal strength. This post irradiation treatment adds additional expense, time, and complexity to the manufacture of these films. However, without the post irradiation treatment, Rf seals formed in films such as those employing HVA-EVA are known to fail above 135° F., and more particularly are known to fail the International Safe Transit Association Standards for Elevated Temperature Testing.

Another disadvantage of Rf seals is that Rf sealing requires relatively complex tooling and expensive electronic equipment. A discussion of Rf sealing and the dielectric loss factor for various polymers is in Encyclopedia of Polymer Science and Engineering, Volume 5 (1993), which is incorporated herein by reference.

There exists a need for thermoplastic films which may be directly heat sealed together in forming inflatable packaging cushions, thereby avoiding the need for radio frequency sealing and the drawbacks associated therewith. Preferably, such films will be stronger, more heat resistant, and also will avoid the need for any post sealing irradiation or other processing steps, thereby simplifying the cushion manufacturing process.

SUMMARY OF THE INVENTION

It is one object of the present invention to provide an inflatable packaging cushion for protecting articles during shipping or during other handling conditions.

Another object of the present invention is to provide an inflatable packaging cushion formed from heat sealable polymer materials which do not require effective amounts of radio frequency active polymers or Rf active seal layers.

Another object of the present invention is to provide an inflatable packaging cushion which does not require post irradiation treatment to obtain the requisite seal strength.

Another object of the present invention is to provide a gas impermeable thermoplastic material suitable for forming inflatable packaging cushions therefrom.

Another object of the present invention is to provide a gas impermeable thermoplastic material for use in forming inflatable packaging cushions which do not require the use of radio frequency sealing techniques.

Another object of the present invention is to provide a gas impermeable thermoplastic material for use in forming inflatable packaging cushions which do not require the use of post irradiation treatment to achieve desirable seal strengths.

Another object of the present invention is to provide an impact resistant gas impermeable thermoplastic material for use in forming inflatable packaging cushions which do not require the use of post irradiation treatment to achieve desirable seal strengths above 135° F.

Another object of the present invention is to provide a gas impermeable thermoplastic material for use in forming inflatable packaging cushions which do not require the use of post irradiation treatment to pass the International Safe Transit Association Standard for Elevated Temperature Testing.

Another object of the present invention is to provide a method of making inflatable packaging cushions from heat sealable polymer materials which do not require effective amounts of radio frequency active polymers or post irradiation treatment to achieve desired seal strengths.

In accordance with the present invention, a multilayer gas impermeable thermoplastic film is provided for forming inflatable packaging cushions therefrom. At least one outer layer of the film is formed of polymer material which allows for heat sealing by conventional techniques without the incorporation of effective amounts Rf active polymers. In accordance with a preferred embodiment, the outer heat seal layer is formed to include linear low density polyethylene material (LLDPE). The outer layer is adhered to an air barrier polymer layer, such as polyamide, poly(ethylene/vinyl alcohol) (EVOH) or other suitable barrier polymer material, using an adhesive layer, typically an anhydride grafted polymer. Additional polymer layers between the adhesive layer and the outer heat sealable layer may be included to provide greater strength and toughness to the film. The multilayer film can be formed using conventional techniques especially coextrusion. The resulting thermoplastic film has enhanced mechanical strength and seal strength to eliminate the need for post irradiation treatment as is generally required when using an Rf active seal layer.

In accordance with one embodiment of the present invention, there is described a fluid fillable cushion comprising first and second films of thermoplastic material. The films are heat sealed together at locations to form at least one, and preferably a plurality of communicatively interconnecting panels suitable for filling with a fluid such as air. Each film includes an outer layer of heat sealable thermoplastic material which has a dielectric loss factor less than about 0.1, and including a gas barrier layer adhered to the outer layer.

In accordance with another embodiment of the present invention, there is described a fluid fillable cushion comprising first and second films of heat sealable thermoplastic material. The films are heat sealed together at locations to form a plurality of communicatively interconnecting fluid fillable panels. Each of the films comprise a gas barrier layer, an adhesive layer on either side of the gas barrier layer, an intervening layer on each of the adhesive layers, and an outer layer on each of the intervening layers. The intervening layers and at least one of the outer layers are selected from heterogeneous and homogeneous copolymers and terpolymers of ethylene and octene, ethylene and hexene and ethylene and butene, ethylene and propene; low-density polyethylene, high-density polyethylene, linear medium density polyethylene, linear low-density polyethylene, very low-density polyethylene, ultralow-density polyethylene, propylene copolymers, polypropylene, polystyrene, ethylene/styrene copolymers, styrene block copolymers, ethylene/vinyl acetate copolymers less than 12% VA, ethylene/acrylic acid copolymer, ionomers and mixtures thereof.

In accordance with another embodiment of the present invention there is described a method of making a fluid fillable cushion. The method comprises providing first and second films of thermoplastic material, each of the films including a first layer of heat sealable thermoplastic material having a dielectric loss factor less than about 0.1 and a gas barrier layer. The first layer of the first film is juxtaposed with the first layer of the second film. At least one fluid fillable panel is formed by heat sealing the first layer of each of the films together at various locations.

BRIEF DESCRIPTION OF THE DRAWINGS

The above description, as well as further objects, features and advantages of the present invention will be more fully understood with reference to the following detailed description of a heat sealable barrier film for fluid fillable packaging cushions having a plurality of fluid communicatively coupled panels and cushions made therefrom, when taken in conjunction with the accompanying drawings, wherein.

DETAILED DESCRIPTION OF THE PREFERRED EMBODIMENTS

In describing the preferred embodiments of the subject matter illustrated and to be described with respect to the drawings, specific terminology will be resorted to for the sake of clarity. However, the invention is not intended to be limited to the specific terms so selected and is to be understood that each specific term includes all technical equivalents which operate in a similar manner to accomplish a similar purpose.

Figure 1:
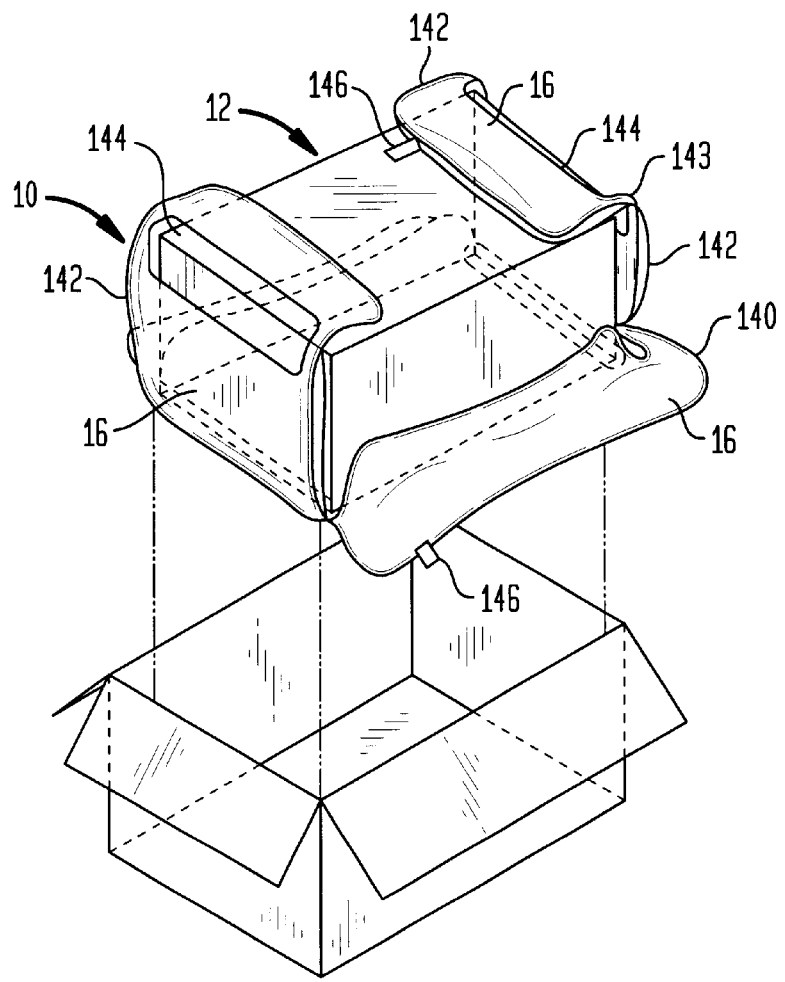
FIG. 1 is a perspective view illustrating an embodiment of a fluid fillable, i.e., inflatable, packaging cushion formed from a multilayer heat sealed thermoplastic film constructed in accordance with one embodiment of the present invention, which cushion is illustrated in an air-filled, inflated form surrounding an article to be protected as it is used in combination with a shipping container.

Referring now to the drawings, wherein like reference numerals represent like elements, there is shown in FIG. 1 a fluid fillable packaging cushion designated generally by reference numeral 10. The cushion 10 is illustrated in an operative air-inflated condition surrounding an article 12 intended to be placed within a shipping carton 14. The inflated packaging cushion 10 is intended to protect the article 12 when shipped in the carton 14, as well as during other handling conditions. In this regard, the inflated packaging cushion 10 is capable of dampening shock loads, i.e., upon dropping of the carton 14 to a predetermined G-force, so as to avoid damage to the article. In addition, the inflated packaging cushion 10 is operative for holding the article 12 suspended within the carton 14 such that in the event the carton 14 is dropped, the article will not come into contact with the carton so as to avoid being damaged during impact. Moreover, the inflated packaging cushion 10 is operative for holding the article 12 suspended within the carton 14 such that thermal insulative protection is provided together with protection against damage from impact.

The inflatable packaging cushion 10 includes a plurality of fluid or gas filled panels 16 or pockets adapted to protect various portions of the article 12. The panels 16 may be interconnected and in fluid communication through internal passageways 143. The cushion 10 is generally made from two sheets of thermoplastic material, each sheet being a multilayer sheet, which are heat sealed together to form the fluid fillable panels 16 and the desired shape and dimensions of the cushion. In this regard, the cushion 10 may include one or more openings capable of conforming to the article 12 to be cushioned, thereby providing the requisite support and protection for the article. The fluid fillable panels 16 are typically filled with low pressure air, another gas, or another fluid which will not diffuse through the thermoplastic material in order to maintain the cushioning properties of the cushion 10.

As thus far described, the fluid fillable packaging cushion 10 is made from at least two sheets of multilayer gas impervious thermoplastic material which, when heat sealed, form the exterior layers of the panels 16. As the article 12 to be protected may be any intended article which may be damaged during transit, for example, a radio, a computer monitor, a toaster, a vase, glassware, machine parts, computers and the like, the shape and dimensions of the packaging cushion will be infinite, defined by the dimension and shape to the article to be protected. In the event the article 12 is to be stored in a carton 14, the packaging cushion 10 will also be dimensioned and shaped to fit within the interior of the carton. However, it is to be understood that the packaging cushion 10 will provide its protective storage function in other packaging environments, for example, plastic bags and the like. Hence, the overall dimension and shape of the packaging cushion 10 need not necessarily conform to a fixed outer carton 14. By way of illustration only, and not by way of limitation, inflatable packaging cushions which will protect an article during shipping are known from the aforementioned Farison, et al. and Pozzo Patents which are incorporated herein by reference. Other inflatable packaging cushions are disclosed in U.S. patent application Ser. No. 09/437,411 by Barmore, et al. entitled "Packaging Cushion and Packaging Assemblies Incorporating Same" filed on the same day as the present application, which is incorporated in its entirety by this reference.

In accordance with the present invention, it has been discovered that inflatable packaging cushions 10 can be constructed from multilayered films having an Rf inactive seal layer. An Rf inactive seal layer is an seal layer that lacks an amount of an Rf active polymer effective to make an Rf seal when exposed to Rf energy. Rf inactive seal layers include those having a dielectric loss factor of less than about 0.1, preferably less than about 0.05, more preferably less than about 0.01. Preferably the Rf inactive seal layer is substantially devoid of Rf active polymer. Further, the multilayered film itself is preferably substantially devoid of Rf active polymer.

The thermoplastic materials forming the outer heat sealable layers of the cushion 10 are those which can be heat sealed using conventional hot-platen, hot-bar, hot-wire or hot-wire trim sealing techniques. In this regard, it is not required of the present invention to use radio-frequency sealing as is required with films incorporating an Rf active seal layer, such as films having a HVA-EVA sealing layer.

The gas impermeable thermoplastic films of the present invention are not encumbered by the limitations discussed above for Rf sealed film structures, thereby providing greater design flexibility in the construction of multilayer films and the resulting fluid fillable packaging cushions 10 therefrom. Cushions 10 of the present invention which utilize the disclosed polymers of heat sealable material can withstand higher temperatures without the additional expense of a post fabrication irradiation treatment to achieve crosslinking known to be preferred in Rf sealed films in order to achieve the required seal performance and strength. Accordingly, the Rf inactive seal layer of the present invention preferably is effective when the cushion is uncrosslinked. Heat sealable thermoplastic films of the present invention which include, by way of example, linear low density polyethylene (LLDPE) are typically stronger than those from HVA-EVA, and may provide stable heat seals up to about 156–205° F., for a period of 24 hours without post irradiation. In addition, heat sealable films, such as LLDPE based films, do not require the same film thickness as those incorporating an Rf active seal layer. Accordingly, films as thin as 1 mil and lower can be used in the present invention.

Figure 2:
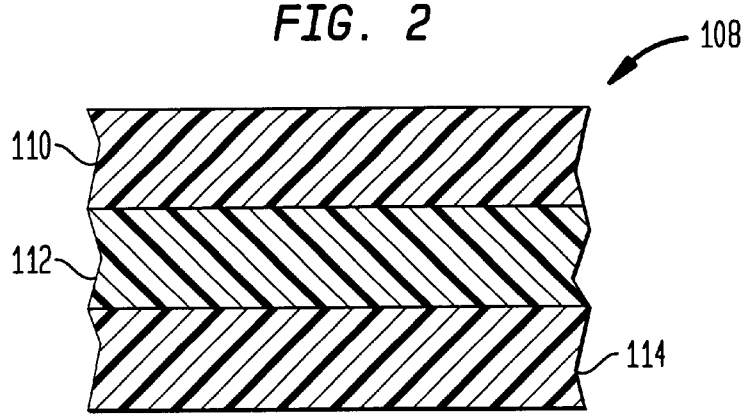
FIG. 2 is a cross-sectional view of a multilayer thermoplastic heat sealable film for making fluid fillable packaging cushions in accordance with one embodiment of the present invention.

Referring now to FIG. 2, there is illustrated a film 108 of air, gas, or other fluid impervious thermoplastic material constructed in accordance with one embodiment of the present invention. The material 108 is formed from three layers 110, 112, 114 to provide a fluid impervious thermoplastic material 108 suitable for use in making a fluid fillable packaging cushion 10 in accordance with the present invention. At least one of the outer layers 110, 114 is formed as the heat sealable layer, i.e., an Rf inactive seal layer. The outer layers 110, 114 additionally contribute to the requisite physical properties required in the construction of a heat sealed packaging cushion, for example, mechanical strength, toughness, wear resistance, tear resistance, puncture resistance, gloss, and the like. The center layer 112, which is sandwiched between outer layers 110, 114, functions as an fluid barrier layer, i.e., functioning as a physical barrier to fluids such as gaseous oxygen molecules thereby reducing permeability of the resulting material 108.

In accordance with the present invention, the outer layers 110, 114 may be formed from a variety of thermoplastic materials. At least one of layers 110, 114 is an Rf inactive seal layer. This layer then forms the heat sealable layer in the cushion 10. In particular, the outer layers 110, 114 may include, or be formed completely of, one or more of the following polymers to form an Rf inactive seal layer: polystyrene, styrene block copolymers, ionomers, polypropylene, and heterogeneous and homogeneous copolymers and terpolymers of ethylene and one or more of the following monomers: propylene, butene, hexene, octene, styrene, acrylic acid, methacrylic acid, vinyl acetate wherein the vinyl acetate content is less than 12% by weight, and mixtures thereof; preferably one or more of the following polymers: low-density polyethylene, high-density polyethylene, linear medium density polyethylene, linear low-density polyethylene, very low-density polyethylene, ultra low-density polyethylene, and propylene/ethylene copolymer.

The outer layers 110, 114 may be of different composition. In addition, it is possible that only one of the outer layers 110, 114 may be a heat sealable layer. For example, one outer layer may not be a heat sealable layer but may possess heat resistant properties, i.e., higher Vicat softening point or melting point than the heat seal layer, which are desirable during the heat sealing operation. In an embodiment in which one outer layer is heat resistant, that layer may include or be formed completely of, one or more polymers from the following list: anhydride grafted polypropylene polymer, isotactic polypropylene, syndiotactic polypropylene, propylene/ethylene copolymer, polyamide, copolyamides, ethylene/vinyl alcohol copolymer, polyesters, copolyesters, polyethylene naphthalate, polycarbonate, polystyrene, syndiotactic polystyrene, and high density polyethylene. In a preferred embodiment, the outer layers 110, 114 will include LLDPE material. The outer layers may be directly adhered to the barrier layer 112, and if so, the outer layers 110, 114 possess adhesive properties, for example, by incorporating anhydride grafted polymers to provide the requisite adhesion properties for adherence to the barrier layer 112.

The barrier layer 112, when in the nature of a gas impermeable layer, may include a variety of polymers which are commonly known as oxygen barrier polymers, for example, polyethylene/vinyl alcohol copolymers (EVOH), SARAN, poly(vinylidine chloride) copolymer (PVDC), polyethylene terephthalate (PET), and polyamides (PA). In the preferred embodiment of FIG. 2, the barrier layer 112 will be formed from nylon, EVOH or PVDC materials. The use of nylon also provides additional strength and toughness to the resulting material 108.

The barrier layer 112 preferably modifies the gas transmission properties of the multilayer film so that the film has an oxygen transmission rate of less than about 1000 cc/m2/24 hours, more preferably less than about 100 cc/m2/24 hours, still more preferably less than about 70 cc/m2/24 hours, even more preferably less than about 40 cc/m2/24 hours, as measured according to the procedure of ASTM Method D-3985 at room temperature and pressure (i.e., standard temperature and pressure).

Figure 3:
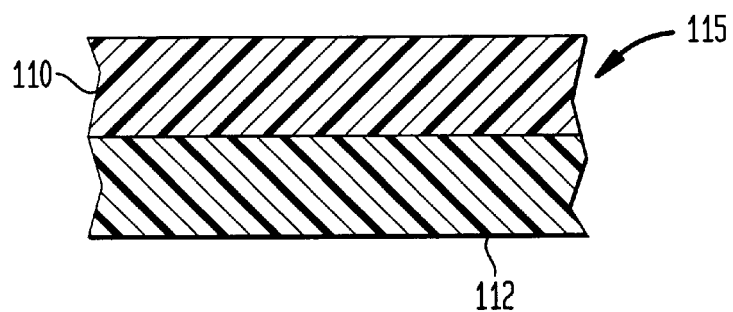
FIG. 3 is a cross-sectional view of a multilayer thermoplastic heat sealable film for making fluid fillable packaging cushions in accordance with another embodiment of the present invention.

Referring now to FIG. 3, there is illustrated a film 115 constructed in accordance with another embodiment of the present invention. The film 115 is formed from two layers 112, 110, which is considered the minimum number of layers required to provide a fluid impervious thermoplastic material suitable for use in making a fluid fillable packaging cushion 10 in accordance with the present invention. As previously described, layer 112 is a barrier layer in the nature of an air, gas, or other fluid impermeable layer, which may include a variety of polymers such as those previously described. Preferably, the barrier layer 112 would be formed from nylon. Nylon is preferred, as the barrier layer 112 will form in this embodiment the exterior layer of the cushion 10, and accordingly, should possess the requisite strength and toughness required for the cushion. In addition, nylon has a relatively high melting temperature which will provide a heat resistant exterior layer to the cushion 10. This is desirable during the heat sealing process as the exterior layer, i.e., barrier layer 112 in this embodiment, will be brought into contact with the heated platen used to form the heat seal welds when joining two sheets of the material 115 together in forming the cushion 10.

Layer 110 is an RF inactive seal layer that may be formed from a variety of thermoplastic heat sealable materials, as more particularly pointed out hereinabove. In the preferred embodiment, layer 110 will include LLDPE material. Layer 110 may be directly adhered to the barrier layer 112 and accordingly layer 110 would ideally possess adhesive properties. Accordingly, the polymers forming layer 110 may be anhydride grafted to provide the requisite adhesion properties for adherence to the barrier layer 112. Alternatively, an intervening layer (not shown) of an anhydride grafted polyethylene material or other suitable adhesive material may be provided for adhering the heat sealable layer 110 to the barrier layer 112.

Figure 4:
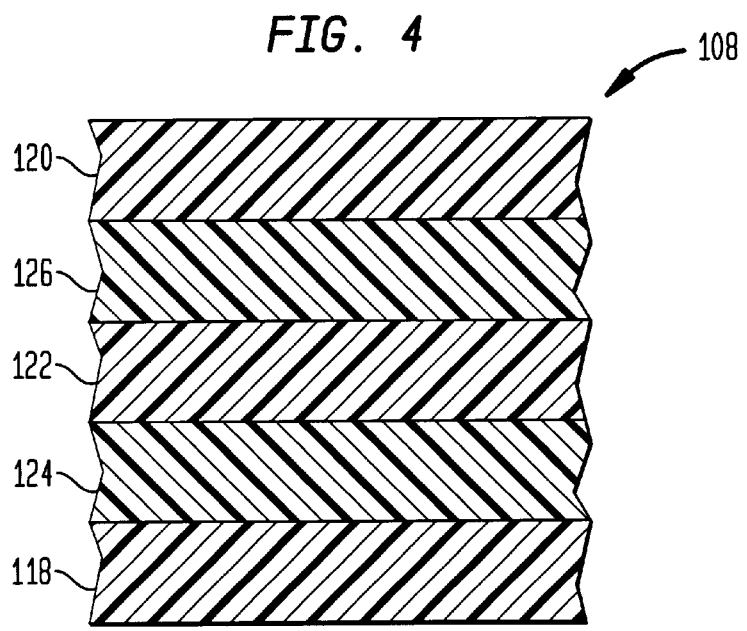
FIG. 4 is a cross-sectional view of a multilayer thermoplastic heat sealable film for making fluid fillable packaging cushions in accordance with another embodiment of the present invention.

Referring now to FIG. 4, there is disclosed a gas impermeable thermoplastic film 116 comprising five coextruded layers constructed in accordance with another embodiment of the present invention. Specifically, the film 116 is formed as a multilayer material having at least one heat sealable Rf inactive seal layer 118 or 120, a central gas impermeable barrier layer 122 disposed between two adhesive layers 124, 126. The film 116 essentially differs from the film 108 of FIG. 2 by the inclusion of the adhesive layers 124, 126 which provide for the adherence of the outer layers 118, 120 in the resulting film. As such, it is not required that the outer layers 118, 120 be in the nature of anhydride grafted polymers having adhesive properties. Accordingly, any of the polymer materials disclosed as suitable for use for outer layers 110, 114, in their non-anhydride grafted form, may also be used in forming outer layers 118, 120. Further in this regard, it is not required that the outer layers 118, 120 be of identical composition. The outer layers 118, 120 may therefore be formed solely from, or may be in the nature of, for example, any of the aforementioned polymers, copolymers or terpolymers, etc.

The barrier layer 122 may be of similar composition to the barrier layer 112. The outer layers 118, 120 may be adhered to the barrier layer 122 by means of the adhesive layers 124, 126. The adhesive layers 124, 126 may be any known adhesive which is suitable for adhering these layers in a composite composition, and preferably, anhydride grafted polymers selected from those polymers forming outer layers 118, 120.

Figure 5:
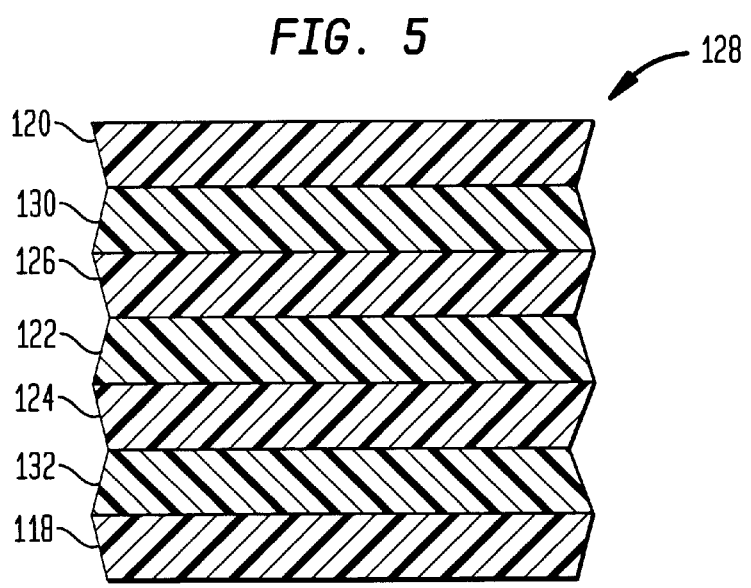
FIG. 5 is a cross-sectional view of a multilayer thermoplastic heat sealable film for making fluid fillable packaging cushions in accordance with still another embodiment of the present invention.

Turning now to FIG. 5, there is disclosed a seven layer gas impermeable thermoplastic film 128. Film 128 is similar to the material 116 but for the addition of intervening layers 130, 132. Layers 130, 132 may be formed from the same compositions from which layers 118, 120 are selected. However, it is to be understood that it is not a requirement that each of the layers 118, 120, 130, 132 be of the same composition. The intervening layers 130, 132 can be formed of less expensive material than the outer layers 118, 120. In addition, the intervening layers 130, 132 can be selected from the aforementioned polymers that provide tougher and/or stronger films than those selected for the outer layers 118, 120.

Additionally, a multilayered film (not shown) according to the present invention may have the layered structure including in order: a first outer layer similar to 120 described above, a second adhesive layer similar to 126 described above, a third barrier layer similar to 122 described above, a fourth adhesive layer similar to 126 described above, a fifth barrier layer similar to 122 described above, a sixth adhesive layer similar to 124 described above, and a seventh outer layer similar to 118 described above.

The films of the present invention may have an overall thickness in the range of about 2.5–20 mils, additionally in the range of about 4.5–10 mils, with the outer layers being about 1 mil or less.

The gas impermeable thermoplastic films 108, 115, 116, 128 may be formed using conventional film forming techniques known in the thermoplastic industry. By way of example only, the materials 108, 115, 116, 128 may be formed by blown or cast coextrusion of the individual layers in a manner well known in the art. By way of further example, the films 108, 115, 116, 128 may be formed as a tubular film by coextrusion, i.e., all layers are simultaneously coextruded, using conventional blown bubble techniques. After cooling, the coextruded tube is collapsed to form the resulting film.

Preferably, the gas impermeable film used in the present invention has a total free shrink of less than about 10%, more preferably less than about 5%, and still more preferably less than about 2%. "Total free shrink" is determined by summing the percent free shrink in the machine direction with the percentage of free shrink in the transverse direction. For example, a film which exhibits 50% free shrink in the transverse direction and 60% free shrink in the machine direction, has a "total free shrink" of 110%. As used herein, the phrase "free shrink" refers to the percent dimensional change in a 10 cm×10 cm specimen of film, when shrunk at 185° F., with the quantitative determination being carried out according to ASTM D 2732, as set forth in the 1990 Annual Book of ASTM Standards, Vol. 08.02, pp. 368–371, which is incorporated herein in its entirety by reference.

The multilayer film of the present invention may be fabricated into a cushion 10 by mating and heat sealing the two outer heat sealable layers in selected locations. Contrary to an Rf sealing step, in which the Rf energy only affects the Rf active seal layers, the heat sealing step of the present invention may heat all layers of the multilayer structure to at least the melting point of the heat sealable layer. In heat sealing the films together to form the cushion, the layers which become the outside or exterior surface of the resulting cushion 10 are in direct contact with a heat source, such as a hot bar, and conduct heat through the multilayer structure to the heat seal layer on the inside of the cushion to melt the two contacting heat sealable layers together. The outside layers of the cushion may incorporate polymers having a higher melting point than the heat seal layers on the inside of the cushion, thereby reducing sticking of the outside cushion layer to the seal bar when contacting it during the heat sealing step.

Figure 6:
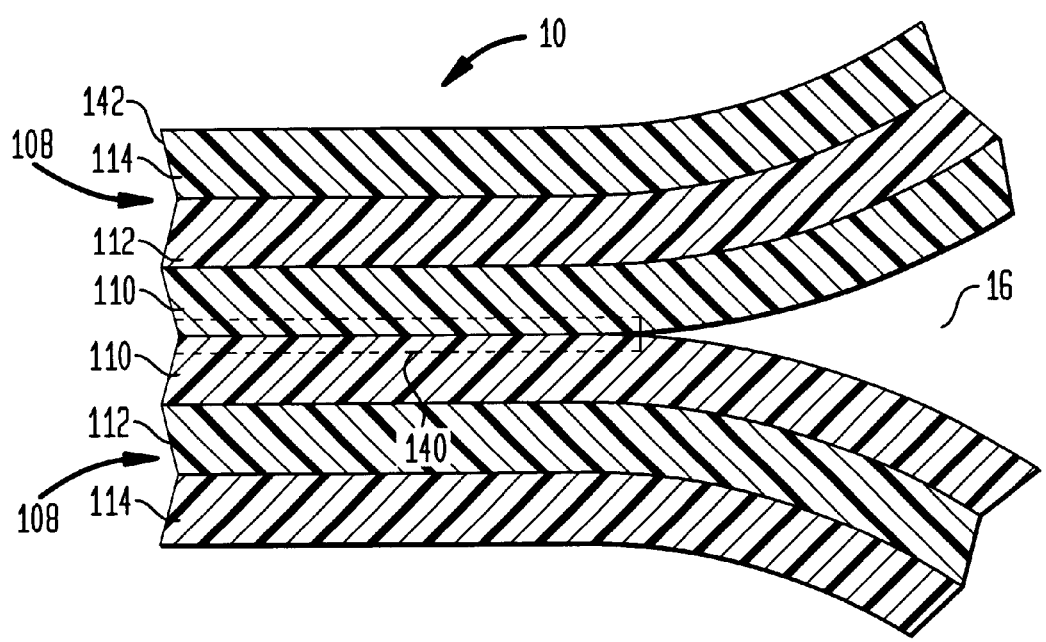
FIG. 6 is a cross-sectional view of a portion of a fluid filled packaging cushion formed from two layers of multilayer thermoplastic heat sealable film having a heat sealed region to define at least one fluid filled panel.

By way of example only and with reference to FIGS. 1 and 6, to form cushion 10, two sheets of film 108 are juxtaposed so that their heat sealable layers 110 confront one another. The sheets of material 108 are then heat sealed together in the region of their peripheral edges along, for example, weld lines 140. The sealing may be performed by conventional heat sealing techniques as noted herein. Cushion 10 as shown in FIG. 1 has external peripheral edges 142 which essentially define the gas filled panels 16. The sheets of film 108 are sealed together along various weld lines 104 to define the plurality of gas filled panels 16 having a shape which corresponds generally to the shape required for the product to be protected. Panels 16 may be formed with a square or rectangular or other configuration to accommodate the square or rectangular or other shape of various products. However, panels 16 are not limited to these shapes, and may be formed with round, oval, hexagonal or other shapes as desired. Moreover, the panels 16 in a single cushion 10 need not all have the same size and shape. Cushion 10 may include only a single panel 16 where only one product is to be packaged, for example, in a layer, or any number of panels depending upon the size of the cushion and the size and configuration of the objects to be held therein. Once the panels 16 have been formed, the portions of the sheets of material 108 interior of weld lines 104 may be removed so that each panel defines one or more openings 144 through cushion 10. Alternatively, the sheets of material 108 may be cut to define the panels 16 prior to being sealed together along weld lines 140. The material defining panels 16 need not be removed entirely. Rather, the material may be slit in an "x" pattern between the opposite diagonal corners of the panels 16 so that it can be pivoted away along weld lines 104 to form the openings 144 through the cushion 10.

Cushion 10 may be provided with one or more inflation valves 146 positioned at any one of a number of locations along peripheral edge 142. The inflation valves 146 may be formed from portions of the thermoplastic film 108 projecting outwardly from peripheral edge 142 and sealed together along spaced weld lines 104 so as to form an inlet passage for an inflation nozzle. After cushion 10 has been inflated, the inlet passages may be hermetically sealed by sealing cushion 10 in the inflated condition. Alternatively, valve 146 may be one of the self-sealing types of valves which are known in the art.

Preferably, a fluid-fillable cushion formed of the films of the present invention is capable of maintaining an inflated or filled pressure of at least about (in order of increasing preference) 2, 4, 6, 8, 10, 12, and 14 psig for a period of at least about (in order of increasing preference) 1 day, 3 days, 7 days, 14 days, and 21 days.

The following examples are provided to illustrate various examples of gas impermeable thermoplastic films of the present invention, and should not be construed to limit the scope of the invention in any way as defined by the appended claims.

EXAMPLE 1

| Layer 1: | 0.70% Exxon Exceed ™ 361C33 + 30% Exxon Escorene ™ LD-102.74 |
| --- | --- |
| Layer 2: | Dow Dowlex ™ 2045.03 |
| Layer 3: | Morton Tymor ™ 1228B |
| Layer 4: | Evalca LC E151A |
| Layer 5: | Morton Tymor ™ 1228B |
| Layer 6: | Dow Dowlex ™ 2045.03 |
| Layer 7: | 0.70% Exxon Exceed ™ 361C33 + 30% Exxon Escorene ™ LD-102.74 |

EXAMPLE 2

| Layer 1: | 0.70% Exxon Exceed ™ 361C33 + 30% Exxon Escorene ™ LD-102.74 |
| --- | --- |
| Layer 2: | Dow Attane ™ 4203 |
| Layer 3: | Morton Tymor ™ 1228B |
| Layer 4: | Evalca LC E151A |
| Layer 5: | Morton Tymor ™ 1228B |
| Layer 6: | Dow Attane ™ 4203 |
| Layer 7: | 0.70% Exxon Exceed ™ 361C33 + 30% Exxon Escorene ™ LD-102.74 |

EXAMPLE 3

| Layer 1: | 0.70% Exxon Exceed ™ 361C33 + 30% Exxon Escorene ™ LD-102.74 |
| --- | --- |
| Layer 2: | Dow Attane ™ 4203 |
| Layer 3: | Morton Tymor ™ 1228B |
| Layer 4: | 70% BASF Ultramid ™ B4 + 30% Emser Girlon ™ CF6S |
| Layer 5: | Morton Tymor ™ 1228B |
| Layer 6: | Dow Attane ™ 4203 |
| Layer 7: | 0.70% Exxon Exceed ™ 361C33 + 30% Exxon Escorene ™ LD-102.74 |

EXAMPLE 4

| Layer 1: | 0.70% Exxon Exceed ™ 361C33 + 30% Exxon Escorene ™ LD-102.74 |
| --- | --- |
| Layer 2: | Dow Attane ™ 4203 |
| Layer 3: | Morton Tymor ™ 1228B |
| Layer 4: | Emser Grilon ™ CR9 |
| Layer 5: | Morton Tymor ™ 1228B |
| Layer 6: | Dow Attane ™ 4203 |
| Layer 7: | 0.70% Exxon Exceed ™ 361C33 + 30% Exxon Escorene ™ LD-102.74 |

EXAMPLE 5

| Layer 1: | 0.70% Exxon Exceed ™ 361C33 + 30% Exxon Escorene ™ LD-102.74 |
| --- | --- |
| Layer 2: | Dow Dowlex ™ 2045.03 |
| Layer 3: | Morton Tymor ™ 1228B |
| Layer 4: | Evalca LC E151A |
| Layer 5: | Morton Tymor ™ 1228B |
| Layer 6: | Dow Dowlex ™ 2045.03 |
| Layer 7: | Exxon Escorene ™ PD-9012.E1 |

EXAMPLE 6

| Layer 1: | 0.70% Exxon Exceed ™ 361C33 + 30% Exxon Escorene ™ LD-102.74 |
| --- | --- |
| Layer 2: | Dow Dowlex ™ 2045.03 |
| Layer 3: | Morton Tymor ™ 1228B |
| Layer 4: | Evalca LC E151A |
| Layer 5: | Morton Tymor ™ 1228B |
| Layer 6: | Exxon Escorene ™ PD-9012.E1 |
| Layer 7: | Exxon Escorene ™ PP-3445 |

EXAMPLE 7

| Layer 1: | 0.70% Exxon Exceed ™ 361C33 + 30% Exxon Escorene ™ LD-102.74 |
| --- | --- |
| Layer 2: | 20% Escorene ™ LD-318.92 + 80% Dowlex ™ 2045.03 |
| Layer 3: | Morton Tymor ™ 1228B |
| Layer 4: | Evalca LC E151A |
| Layer 5: | Morton Tymor ™ 1228B |
| Layer 6: | 20% Escorene ™ LD-318.92 + 80% Dowlex ™ 2045.03 |
| Layer 7: | 0.70% Exxon Exceed ™ 361C33 + 30% Exxon Escorene ™ LD-102.74 |

EXAMPLE 8

| Layer 1: | 0.70% Exxon Exceed ™ 361C33 + 30% Exxon Escorene ™ LD-102.74 |
| --- | --- |
| Layer 2: | 40% Escorene ™ LD-318.92 + 60% Dowlex ™ 2045.03 |
| Layer 3: | Morton Tymor ™ 1228B |
| Layer 4: | Evalca LC E151A |
| Layer 5: | Morton Tymor ™ 1228B |
| Layer 6: | 40% Escorene ™ LD-318.92 + 60% Dowlex ™ 2045.03 |
| Layer 7: | 0.70% Exxon Exceed 361C33 + 30% Exxon Escorene ™ LD-102.74 |

EXAMPLE 9

| Layer 1: | 0.70% Exxon Exceed ™ 361C33 + 30% Exxon Escorene ™ LD-102.74 |
| --- | --- |
| Layer 2: | Dowlex ™ NG 3347A |

-continued

| | |
|---|---|
| Layer 3: | Morton Tymor ™ 1228B |
| Layer 4: | Evalca LC E151A |
| Layer 5: | Morton Tymor ™ 1228B |
| Layer 6: | Dowlex ™ NG 3347A |
| Layer 7: | 0.70% Exxon Exceed ™ 361C33 + 30% Exxon Escorene ™ LD-102.74 |

EXAMPLE 10

| | |
|---|---|
| Layer 1: | ,98% Equistar NA 324.009 + 2% Ampacet 10853 Antiblock Masterbatch |
| Layer 2: | 20% Escorene ™ LD-318.92 + 80% Dowlex ™ 2045.03 |
| Layer 3: | Morton Tymor ™ 1228B |
| Layer 4: | Evalca LC E151A |
| Layer 5: | Morton Tymor ™ 1228B |
| Layer 6: | 20% Escorene LD-318.92 + 80% Dowlex 2045.03 |
| Layer 7: | 0.70% Exxon Exceed ™ 361C33 + 30% Exxon Escorene ™ LD-102.74 |

EXAMPLE 11

| | |
|---|---|
| Layer 1: | 98% Equistar NA 324.009 + 2% Ampacet 10853 |
| Layer 2: | 40% Escorene ™ LD-318.92 + 60% Dowlex 2045.03 |
| Layer 3: | Morton Tymor ™ 1228B |
| Layer 4: | Evalca LC E151A |
| Layer 5: | Morton Tymor ™ 1228B |
| Layer 6: | 40% Escorene ™ LD-318.92 + 60% Dowlex 2045.03 |
| Layer 7: | 0.70% Exxon Exceed ™ 361C33 + 30% Exxon Escorene LD-102.74 |

EXAMPLE 12

| | |
|---|---|
| Layer 1: | Escorene ™ PP-3445 |
| Layer 2: | Escorene ™ PD-9012.E1 |
| Layer 3: | Morton Tymor ™ 1228B |
| Layer 4: | Evalca LC E151A |
| Layer 5: | Morton Tymor ™ 1228B |
| Layer 6: | 40% Escorene ™ LD-318.92 + 60% Dowlex ™ 2045.03 |
| Layer 7: | 0.70% Exxon Exceed ™ 361C33 + 30% Exxon Escorene LD-102.74 |

EXAMPLE 13

| | |
|---|---|
| Layer 1: | 70% Dowlex ™ 2045.03 + 30% Escorene ™ LD-102.74 |
| Layer 2: | 70% Dowlex ™ 2045.03 + 30% Escorene ™ LD-102.74 |
| Layer 3: | Morton Tymor ™ 1228B |
| Layer 4: | Emser Grilon ™ CR9 |
| Layer 5: | Morton Tymor ™ 1228B |
| Layer 6: | 70% Dowlex ™ 2045.03 + 30% Escorene ™ LD-102.74 |
| Layer 7: | 70% Dowlex ™ 2045.03 + 30% Escorene ™ LD-102.74 |

EXAMPLE 14

| | |
|---|---|
| Layer 1: | 70% Dowlex ™ 2045.03 + 30% Escorene ™ LD-102.74 |
| Layer 2: | 70% Dowlex ™ 2045.03 + 30% Escorene ™ LD-102.74 |

-continued

| | |
|---|---|
| Layer 3: | Morton Tymor ™ 1228B |
| Layer 4: | BASF Ultramid ™ B4 |
| Layer 5: | Morton Tymor ™ 1228B |
| Layer 6: | 70% Dowlex ™ 2045.03 + 30% Escorene ™ LD-102.74 |
| Layer 7: | 70% Dowlex ™ 2045.03 + 30% Escorene ™ LD-102.74 |

EXAMPLE 15

| | |
|---|---|
| Layer 1: | 70% Dowlex ™ 2045.03 + 30% Escorene ™ LD-102.74 |
| Layer 2: | 70% Dowlex ™ 2045.03 + 30% Escorene ™ LD-102.74 |
| Layer 3: | Morton Tymor ™ 1228B |
| Layer 4: | BASF Ultramid ™ B4 + 20% Emser Grilon ™ CR9 |
| Layer 5: | Morton Tymor ™ 1228B |
| Layer 6: | 70% Dowlex ™ 2045.03 + 30% Escorene ™ LD-102.74 |
| Layer 7: | 70% Dowlex ™ 2045.03 + 30% Escorene ™ LD-102.74 |

EXAMPLE 16

| | |
|---|---|
| Layer 1: | 70% Dow LDPE 1321 + 30% Equistar NA345-013 |
| Layer 2: | 70% Dow LDPE 1321 + 30% Equistar NA345-013 |
| Layer 3: | Morton Tymor ™ 1228B |
| Layer 4: | BASF Ultramid ™ B4 |
| Layer 5: | Morton Tymor ™ 1228B |
| Layer 6: | 70% Dow LDPE 1321 + 30% Equistar NA345-013 |
| Layer 7: | 70% Dow LDPE 1321 + 30% Equistar NA345-013 |

The gas impermeable thermoplastic materials of the present invention may also include pigmented films to impart color, particularly in the outer and/or intervening layers. The following examples are illustrative of pigmented films pursuant to another embodiment of the present invention.

EXAMPLE 17

| | |
|---|---|
| Layer 1: | 60% Dowlex ™ 2045.03 + 25% Escorene ™ LD-102.74 + 15% Polymer Color RCC-5037-H (Red Masterbatch) |
| Layer 2: | 60% Dowlex ™ 2045.03 + 25% Escorene ™ LD-102.74 + 15% Polymer Color RCC-5037-H (Red Masterbatch) |
| Layer 3: | Morton Tymor ™ 1228B |
| Layer 4: | BASF Ultramid ™ B4 |
| Layer 5: | Morton Tymor ™ 1228B |
| Layer 6: | 80% Dowlex ™ 2045 + 20% Teknor EPE-10214-C (White Masterbatch) |
| Layer 7: | 70% Dowlex ™ 2045.03 + 30% Escorene ™ LD-102.74 |

EXAMPLE 18

| | |
|---|---|
| Layer 1: | 0.70% Dowlex ™ 2045.03 + 30% Escorene LD-102.74 |
| Layer 2: | 0.70% Dowlex ™ 2045.03 + 30% Escorene LD-102.74 |
| Layer 3: | Morton Tymor ™ 1228B |
| Layer 4: | BASF Ultramid ™ B4 |
| Layer 5: | Morton Tymor ™ 1228B |
| Layer 6: | 75% Dowler ™ 2045 + 25% Polymer Color Silver MMC-14765 |
| Layer 7: | 75% Dowler ™ 2045 + 25% Polymer Color Silver MMC-14765 |

One of the outer layers of the gas impermeable thermoplastic films 108, 116, 128 may incorporate a polyamide or polyester polymer, along with LLDPE polymers. Illustrative examples of gas impermeable thermoplastic films pursuant to this embodiment of the present invention are as follows:

EXAMPLE 19

| Layer 1: | 0.70% Exxon Exceed ™ 361C33 + 30% Escorene ™ LD-102.74 |
| --- | --- |
| Layer 2: | Dow Attane ™ 4203 |
| Layer 3: | Dow Attane ™ 4203 |
| Layer 4: | Dow Attane ™ 4203 |
| Layer 5: | Dow Attane ™ 4203 |
| Layer 6: | Morton Tymor ™ 1228B |
| Layer 7: | Emser Grilon ™ CR9 |

EXAMPLE 20

| Layer 1: | 0.70% Exxon Exceed ™ 361C33 + 30% Escorene ™ LD-102.74 |
| --- | --- |
| Layer 2: | Dow Dowlex ™ 2045.03 |
| Layer 3: | Dow Dowlex ™ 2045.03 |
| Layer 4: | Dow Dowlex ™ 2045.03 |
| Layer 5: | Dow Dowlex ™ 2045.03 |
| Layer 6: | Morton Tymor ™ 1228B |
| Layer 7: | Emser Grilon ™ CR9 |

EXAMPLE 21

| Layer 1: | 0.70% Exxon Exceed ™ 361C33 + 30% Escorene ™ LD-102.74 |
| --- | --- |
| Layer 2: | Dow Dowlex ™ 2045.03 |
| Layer 3: | Dow Dowlex ™ 2045.03 |
| Layer 4: | Dow Dowlex ™ 2045.03 |
| Layer 5: | Dow Dowlex ™ 2045.03 |
| Layer 6: | Morton Tymor ™ 1228B |
| Layer 7: | 70% BASF Ultramid ™ B4 + 30% Emser Grilon CF6S |

EXAMPLE 22

A 6 mil thick multilayer film, each layer having the percent of total thickness as shown in parentheses:

| Layer 1: | Heat seal layer of linear low density polyethylene (LLDPE) (8%) |
| --- | --- |
| Layer 2: | Structural layer of LLDPE and low density polyethylene blend (24%) |
| Layer 3: | Adhesive layer of anhydride grafted LLDPE (8%) |
| Layer 4: | Structural layer of polyamide (i.e., blend of semi-crystalline and amorphous Nylon) also having some barrier properties (11%) |
| Layer 5: | Adhesive layer of anhydride grafted LLDPE (8%) |
| Layer 6: | Structural layer of polyamide (i.e., blend of semi-crystalline and amorphous Nylon) also having some barrier properties (11%) |
| Layer 7: | Adhesive layer of an anhydride grafted ethylene vinyl acetate having a vinyl acetate contemt of less than 12.0% by weight (22%) |
| Layer 8: | Heat resistant structural layer of polyamide (8%). |

EXAMPLE 23

This example is the same as Example 22, except that Layer 5 is a barrier layer of ethylene vinyl alcohol (EVOH) rather than an adhesive layer of anhydride grafted LLDPE.

EXAMPLE 22

A 6 mil thick multilayer film, each layer having the percent of total thickness as shown in parentheses:

| Layer 1: | Heat seal layer of linear low density polyethylene (LLDPE) (29%) |
| --- | --- |
| Layer 2: | Adhesive layer of anhydride grafted LLDPE (8%) |
| Layer 3: | Structural layer of polyamide (i.e., Nylon 6) also having some barrier properties (8%) |
| Layer 4: | Barrier layer of EVOH (10%) |
| Layer 5: | Structural layer of polyamide (i.e., Nylon 6) also having some barrier properties (7%) |
| Layer 6: | Adhesive layer of an anhydride grafted ethylene vinyl acetate having a vinyl acetate content of less than 12.0% by weight (23%) |
| Layer 7: | Heat resistant structural layer of polyamide (15%). |

The specific polymers identified with respect to the illustrative examples 1–21 are designated as follows:

EXCEED ™ 361C33

| Supplier: | EXXON |
| --- | --- |
| Generic Name: | Resin-Polyethylene, Linear, Single Site Catalyzed |
| Chemical Nature: | Ethylene, Hexene-1 Copolymer |
| Key Properties: | Melt Index 4.5; Density 0.917 g/cc |

TYMOR ™ 1228B

| Supplier: | Morton |
| --- | --- |
| Generic Name: | Resin-LLDPE Based Adhesive |
| Chemical Nature: | Ethylene/Butene Copolymer (LLDPE), Maleic Anhydride |
| Key Properties: | Melt Index 2.1; Density 0.921 g/cc |

ESCORENE ™ LD-102.74

| Supplier: | EXXON |
| --- | --- |
| Generic Name: | Resin-Polyethylene, Low Density, (LDPE) |
| Chemical Nature: | Low Density Polyethylene Resin |
| Key Properties: | Melt Index 6.5: Density 0.920 g/cc |

DOWLEX ™ 2045.03

| Supplier: | Dow |
| --- | --- |
| Generic Name: | Resin-Polyethylene, Linear Low Density, (LLDPE) |
| Chemical Nature: | Ethylene/Octene Copolymer |
| Key Properties: | Melt Index 1.1; Density 0.920 g/cc; MP 123–126° C.; 6.5% Octene |

EVAL LC E151A

| Supplier: | Eval of America |
| --- | --- |
| Generic Name: | Resin-EVOH |
| Chemical Nature: | Ethylene/Vinyl Alcohol Copolymer |
| Key Properties: | Melt Index 1.6; MP 165° C.; Mole % Ethylene 44% |

ATTANE ™ 4203

| Supplier: | Dow |
| --- | --- |
| Generic Name: | Resin-Polyethylene, Linear Low Density, (VLDPE) |
| Chemical Nature: | Ethylene/Octene Copolymer |
| Key Properties | Melt Index 0.8; Density 0.905 g/cc; MP 123° C.; 11.5% Octene |

ULTRAMID ™ B4

| Supplier: | BASF |
| --- | --- |
| Generic Name: | Resin-Nylon 6 |
| Chemical Nature: | Polycaprolactam (Nylon 6) |
| Key Properties: | MP 220° C., Relative Viscosity 4.04 (Sulfuric Acid) |

-continued

GRILON CF6S ™

| | |
|---|---|
| Supplier: | Emser |
| Generic Name: | Resin-Nylon 6/12 |
| Chemical Nature: | Caprolactam and Laurolactam Copolyamide |
| Key Properties: | MP 130° C.; Density 1.05; Relative Viscosity 1.79 (Sulfuric Acid) |

GRILON CR9 ™

| | |
|---|---|
| Supplier: | Emser |
| Generic Name: | Resin-Nylon 6/12 |
| Chemical Nature: | 90% Caprolactam and 10% Lauryl Lactam Copolyamide |
| Key Properties: | MP 203° C. |

ESCORENE ™ LD-318.92

| | |
|---|---|
| Supplier: | EXXON |
| Generic Name: | Resin-EVA |
| Chemical Nature: | Ethylene/Vinyl Acetate Copolymer |
| Key Properties: | VA 9%; MI 2.0; Density 0.930 g/cc |

ESCORENE ™ PP-9012.E1

| | |
|---|---|
| Supplier: | EXXON |
| Generic Name: | Resin-Propylene/Ethylene Copolymer |
| Chemical Nature: | Propylene Copolymer Resin |
| Key Properties: | Melt Flow 5.0–7.0; 2.8% by wt. Ethylene, Density 0.902 g/cc |

ESCORENE ™ PP.-3445

| | |
|---|---|
| Supplier: | EXXON |
| Generic Name: | Resin-Polypropylene |
| Chemical Nature: | Isotactic Propylene Hompolymer |
| Key Properties: | Melt Flow –33–39, Density 0.906 g/cc |

DOWLEX

| | |
|---|---|
| Supplier: | Dow |
| Generic Name: | Resin-Polyethylene, Linear Low Density (LLDPE) |
| Chemical Nature: | Ethylene/Octene Copolymer |
| Key Properties: | Melt Index 2.3; Density 0.917 g/cc |

NA324-009

| | |
|---|---|
| Supplier: | Equistar (Formerly Quantum/USI) |
| Generic Name: | Resin-Polyethylene, Medium Density |
| Chemical Nature: | Polyethylene |
| Key Properties: | Melt Index 3.0; Density 0.932 g/cc |

10853 ANTIBLOCK POLYETHYLENE MASTERBATCH

| | |
|---|---|
| Supplier: | Ampacet |
| Generic Name: | Masterbatch Pre-Compound |
| Chemical Nature: | LLDPE With Diatomaceous Silica |
| Key Properties: | 80.6% by Wt. LLDPE, 19.4% Wt. Diatomaceous Silica, Melt Index 1.5 |

NA345-013

| | |
|---|---|
| Supplier: | Equistar (Formerly Quantum/USI) |
| Generic Name: | Resin-Polyethylene, Low Density (LDPE) |
| Chemical Nature: | Polyethylene |
| Key Properties: | Melt Index 1.8; Density 0.922 g/cc |

LDPE 1321

| | |
|---|---|
| Supplier: | Dow |
| Generic Name: | Resin-Polyethylene, Low Density |
| Chemical Nature: | Low Density Polyethylene Resin |
| Key Properties: | Melt Index 0.22, Density 0.921 g/cc |

EPE 10214-C OPAQUE WHITE COLOR CONCENTRATE

| | |
|---|---|
| Supplier: | Teknor Color |
| Generic Name: | Color Concentrate Masterbatch |
| Chemical Nature: | 50% by Wt. Titanium Dioxide, 50% LDPE |
| Key Properties: | 50% Ash |

RCC-5037-H RED/FLAME COLOR CONCENTRATE

| | |
|---|---|
| Supplier: | Polymer Color (Division of Clariant) |
| Generic Name: | Color Concentrate Masterbatch |
| Chemical Nature: | LDPE Plus Colorant (Pigment) |

-continued

| | |
|---|---|
| Key Properties: | Density 1.066 g/cc |

MMC-14765 SILVER

| | |
|---|---|
| Supplier: | Polymer Color (Division of Clariant) |
| Generic Name: | Color Concentrate Masterbatch |
| Chemical Nature: | Polyethylene Plus Colorant (Pigment) |

The present invention, as thus far described, advantageously applies to the transporting and to the handling of any fragile merchandise, and especially electronic, computer or other equipment, with the ability to use the inflatable packaging cushion 10 to protect all sides of the product. The cushion 10 may be designed to be reused several times.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A fluid fillable cushion comprising:
    a) first and second heat sealable coextruded films, each of said films comprising a heat sealable outer layer having a dielectric loss factor of less than about 0.1 and a barrier layer, said outer layer of said first heat sealable film being heat sealed to said outer layer of said second heat sealable film at selected locations to provide a fluid fillable panel; and
    b) a valve in fluid communication with said panel to allow introduction of a fluid into said panel.

2. The cushion of claim 1, wherein said barrier layers are selected from the group consisting of poly(ethylene/vinyl alcohol), poly(vinylidine chloride) copolymers, poly (ethylene terephthalate), polyethylene(naphthalate) and polyamides.

3. The cushion of claim 1, wherein said heat sealable outer layers comprise a linear low density polyethylene material.

4. The cushion of claim 1, wherein:
    a) each of said first and second films comprises a first heat sealable outer layer and a second outer layer; and
    b) said barrier layers of the first and second films are between said first and second outer layers.

5. The cushion of claim 4, wherein said first heat sealable outer layer of each of said first and second films includes a polymer selected from the group consisting of polystyrene, styrene block copolymers, ionomers, polypropylene, and heterogeneous and homogeneous copolymers and terpolymers of ethylene and one or more of the following monomers: propylene, butene, hexene, octene, styrene, acrylic acid, methacrylic acid, vinyl acetate wherein the vinyl acetate content is less than 12% by weight, and mixtures thereof.

6. The cushion of claim 5, wherein the first heat sealable outer layer of each of said first and second films includes a polymer selected from the group consisting of low-density polyethylene, high-density polyethylene, linear medium density polyethylene, linear low-density polyethylene, very low-density polyethylene, ultralow-density polyethylene, propylene/ethylene copolymer, and mixtures thereof.

7. The cushion of claim 5, wherein the second outer layer of each of said first and second films includes a polymer selected from the group consisting of anhydride grafted polypropylene polymer, isotactic polypropylene, syndiotactic polypropylene, propylene/ethylene copolymer, polyamide, copolyamides, ethylene/vinyl alcohol copolymer, polyesters, copolyesters, polyethylene naphthalate, polycarbonate, polystyrene, syndiotactic polystyrene, and high density polyethylene, and mixtures thereof.

8. The cushion of claim 4, wherein at least one of said first and second outer layers of each of said first and second films comprises an anhydride grafted thermoplastic polymer material.

9. The cushion of claim 4, wherein each of said first and second films further includes an adhesive layer between said barrier layer and said first and second outer layers.

10. The cushion of claim 9, wherein said adhesive layer comprises an anhydride grafted thermoplastic polymer material.

11. The cushion of claim 4, wherein each of said first and second films further includes at least one intervening layer of thermoplastic material between each of said first and second outer layers and said barrier layer.

12. The cushion of claim 11, wherein said intervening layer includes a polymer selected from the group consisting of polystyrene, styrene block copolymers, ionomers, polypropylene, and heterogeneous and homogeneous copolymers and terpolymers of ethylene and one or more of the following monomers: propylene, butene, hexene, octene, styrene, acrylic acid, methacrylic acid, vinyl acetate wherein the vinyl acetate content is less than 12% by weight, and mixtures thereof.

13. The cushion of claim 11, wherein at least one of said intervening layer, said first outer layer, and said second outer layer includes a colorant.

14. The cushion of claim 1, wherein said first and second films have a thickness in the range of about 2.5 to about 20 mils.

15. The cushion of claim 1 further comprising a plurality of said fluid fillable panels interconnected to place said panels in fluid communication, wherein at least one of said panels includes said valve.

16. The cushion of claim 15 wherein said plurality of panels is formed by heat sealing said outer layer of said first heat sealable film to said outer layer of said second heat sealable film at selected locations.

17. A fluid fillable cushion comprising:
a) first and second heat sealable coextruded films, each of said films comprising a heat sealable outer layer having a dielectric loss factor of less than about 0.1, a barrier layer, an adhesive layer disposed on either side of said barrier layer, and an intervening layer disposed on each of said adhesive layers, said outer layer of said first film being heat sealed to said outer layer of said second film at selected locations to provide a fluid fillable panel; and
b) a valve in fluid communication with said panel to allow introduction of a fluid into said panel.

18. The cushion of claim 17, wherein said barrier layer is selected from the group consisting of poly(ethylene/vinyl alcohol), poly(vinylidine chloride) copolymers, polyethylene naphthalate, polyethylene terephthalate and polyamides.

19. The cushion of claim 17, wherein at least one of said outer layers comprises linear low density polyethylene material.

20. The cushion of claim 17, wherein said heat sealable outer layer of each of said first and second films includes a polymer selected from the group consisting of polystyrene, styrene block copolymers, ionomers, polypropylene, and heterogeneous and homogeneous copolymers and terpolymers of ethylene and one or more of the following monomers: propylene, butene, hexene, octene, styrene, acrylic acid, methacrylic acid, vinyl acetate wherein the vinyl acetate content is less than 12% by weight, and mixtures thereof.

21. The cushion of claim 17, wherein said adhesive layers comprise an anhydride grafted thermoplastic polymer material.

22. The cushion of claim 17, wherein said intervening layers are selected from the group consisting of polystyrene, styrene block copolymers, ionomers, polypropylene, and heterogeneous and homogeneous copolymers and terpolymers of ethylene and one or more of the following monomers: propylene, butene, hexene, octene, styrene, acrylic acid, methacrylic acid, vinyl acetate wherein the vinyl acetate content is less than 12% by weight, and mixtures thereof.

23. The cushion of claim 17, wherein at least one of said intervening layers or said outer layers includes a colorant.

24. The cushion of claim 17, wherein said first and second films have a thickness in the range of about 2.5–20 mils.

25. The cushion of claim 17, wherein said first and second films have a thickness in the range of about 4.5–10 mils.

26. The cushion of claim 17 further comprising a plurality of said fluid fillable panels interconnected to place said panels in fluid communication, wherein at least one of said panels includes said valve.

27. The cushion of claim 17, wherein each of said first and second films comprises a first heat sealable outer layer and a second outer layer, said first and second outer layers having a different composition from each other.

28. A fluid fillable cushion comprising:
a) first and second heat sealable coextruded films, each of said films having an outer Rf inactive seal layer and a barrier layer, said outer layer of said first heat sealable film being heat sealed to said outer layer of said second heat sealable film at selected locations to provide a fluid fillable panel; and
b) a valve in fluid communication with said panel to allow introduction of a fluid into said panel.

29. A method of making a fluid fillable cushion, said method comprising the steps of:
providing first and second coextruded films, each of said films including a first heat sealable outer layer having a dielectric loss factor of less than about 0.1 and a barrier layer;
juxtaposing said first outer layer of said first film with said first outer layer of said second film;
heat sealing said first outer layer of each of said films together at locations to form a fluid fillable panel; and
installing a valve in fluid communication with said panel to allow introduction of a fluid into said panel.

30. The method of claim 29, wherein said providing step comprises providing said first and second films in the form of individual sheets.

31. The method of claim 29, wherein said barrier layer is selected from the group consisting of poly(ethylene/vinyl alcohol), poly(vinylidine chloride) copolymers, poly (ethylene terephthalate), polyethylene(naphthalate) and polyamides.

32. The method of claim 29, wherein said first outer layer of each first and second film comprises a linear low density polyethylene material.

33. The method of claim 29, further including providing a second layer of thermoplastic material disposed between said barrier layer and said first outer layer.

34. The method of claim 33, wherein said first heat sealable outer layer of each of said first and second films includes a polymer selected from the group consisting of polystyrene, styrene block copolymers, ionomers, polypropylene, and heterogeneous and homogeneous copolymers and terpolymers of ethylene and one or more of the following monomers: propylene, butene, hexene, octene, styrene, acrylic acid, methacrylic acid, vinyl acetate wherein the vinyl acetate content is less than 12% by weight, and mixtures thereof.

35. The method of claim 33, wherein said first and second layers comprise anhydride grafted thermoplastic polymer material.

36. The method of claim 33, further including providing an adhesive layer between said barrier layer and each of said first and second layers.

37. The method of claim 36, wherein said adhesive layer comprises an anhydride grafted thermoplastic polymer material.

38. The method of claim 33, further including providing at least one intervening layer of thermoplastic material between each of said first and second layers and said barrier layer.

39. The method of claim 38, wherein said intervening layers include a polymer selected from the group consisting of polystyrene, styrene block copolymers, ionomers, polypropylene, and heterogeneous and homogeneous copolymers and terpolymers of ethylene and one or more of the following monomers: propylene, butene, hexene, octene, styrene, acrylic acid, methacrylic acid, vinyl acetate wherein the vinyl acetate content is less than 12% by weight, and mixtures thereof.

40. The method of claim 38, wherein at least one of said intervening layers or said first and second layers includes a colorant.

41. The method of claim 38, wherein said first and second layers have a composition different from said intervening layers.

42. The method of claim 29, wherein said first and second films each have a thickness in the range of about 2.5–20 mils.

43. The method of claim 29, wherein said first and second films each have a thickness in the range of about 4.5–10 mils.

44. The method of claim 29, further including heat sealing said first outer layer of said first and second films together at a plurality of locations to form a plurality of said fluid fillable panels.

45. The method of claim 29, further including inflating said panel with a gas.

46. The method of claim 45, further including hermetically sealing said valve subsequent to said inflation step.

* * * * *

UNITED STATES PATENT AND TRADEMARK OFFICE
CERTIFICATE OF CORRECTION

PATENT NO. : 6,244,441 B1
DATED : June 12, 2001
INVENTOR(S) : Ahlgren

It is certified that error appears in the above-identified patent and that said Letters Patent is hereby corrected as shown below:

Column 10,
Lines 36, 51, 58 and 65, "104" should read -- 140 --.

Column 13,
Line 14, ",98%" should read -- 98% --.

Signed and Sealed this

Eighteenth Day of December, 2001

Attest:

Attesting Officer

JAMES E. ROGAN
*Director of the United States Patent and Trademark Office*